United States Patent [19]

Maichel

[11] Patent Number: 6,041,806
[45] Date of Patent: Mar. 28, 2000

[54] METHOD AND BALL VALVE ASSEMBLY FOR INSERTING A VALVE IN A LINE

[76] Inventor: Jeffrey L. Maichel, 36493 Summitville St., Temecula, Calif. 92592

[21] Appl. No.: 09/215,746

[22] Filed: Dec. 18, 1998

[51] Int. Cl.[7] ................................................... F16K 43/00
[52] U.S. Cl. ................................. 137/15; 30/93; 137/318
[58] Field of Search .......................... 137/15, 318; 30/93; 408/80, 83.5, 99, 100

[56] References Cited

U.S. PATENT DOCUMENTS

| | | | |
|---|---|---|---|
| 3,385,314 | 5/1968 | Thompson | 137/318 |
| 3,603,387 | 9/1971 | Schoeffler | 137/318 |
| 3,650,547 | 3/1972 | Tickett | 137/318 |
| 3,652,107 | 3/1972 | Tickett | 137/318 |
| 3,703,906 | 11/1972 | Tickett | 137/318 |
| 3,735,775 | 5/1973 | Tickett | 137/318 |
| 4,415,000 | 11/1983 | Odmann | 137/318 |
| 4,516,598 | 5/1985 | Stupak | 137/318 |
| 4,730,636 | 3/1988 | Volgstadt et al. | 137/318 |
| 5,620,020 | 4/1997 | Collins | 137/318 |
| 5,732,728 | 3/1998 | Maichel | 137/15 |

*Primary Examiner*—George L. Walton
*Attorney, Agent, or Firm*—Loyal McKinley Hanson

[57] ABSTRACT

A method for inserting a valve in a line, including polyethylene, PVC, plastic, and copper line, pipe, and tubing, without, for example, having to first shut down a line containing fluid under pressure, includes the step of providing first and second ball valve subassemblies that are adapted to be assembled over the line to form a ball valve assembly having a ball component within a housing component. The ball defines a bore, includes cutting edges, and is adapted to be rotated ninety degrees within the housing about an axis of ball rotation perpendicular to the central axis of the bore. The method proceeds by assembling the first and second ball valve subassemblies over the line, and rotating the ball relative to the line so that the cutting edges on the ball cut out a section of the line. In one embodiment, the ball is rotated ninety degrees within the housing about the axis of ball rotation so that the cutting edges slice through the line. In another embodiment, the second subassembly is adapted to enable the user to rotate the housing and the ball on the line as the ball is rotated ninety degrees to the closed position in order to thereby facilitate cutting.

7 Claims, 4 Drawing Sheets

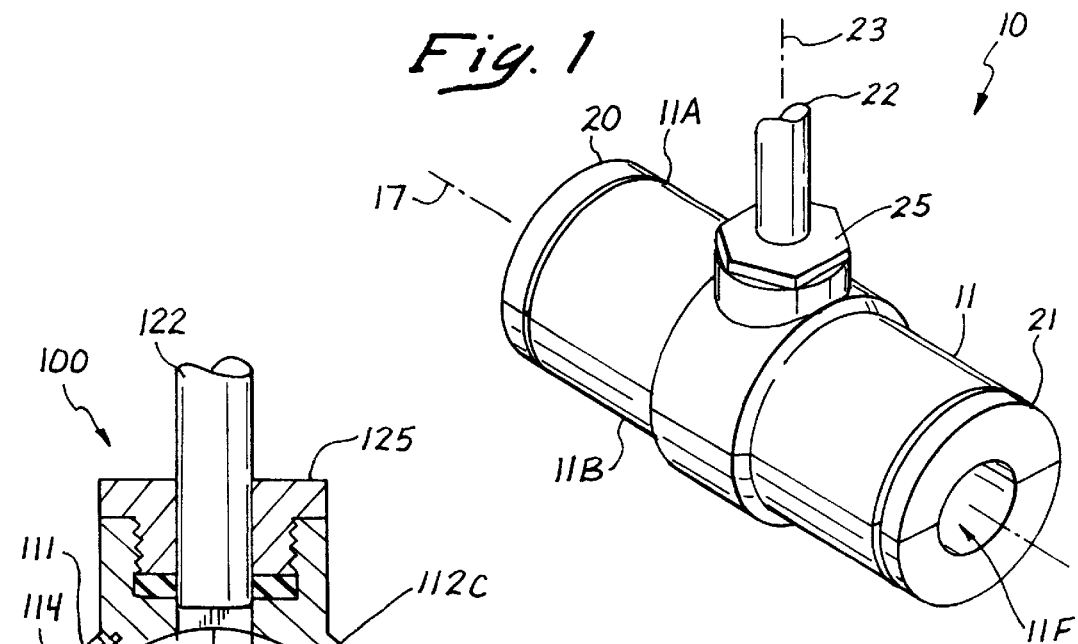
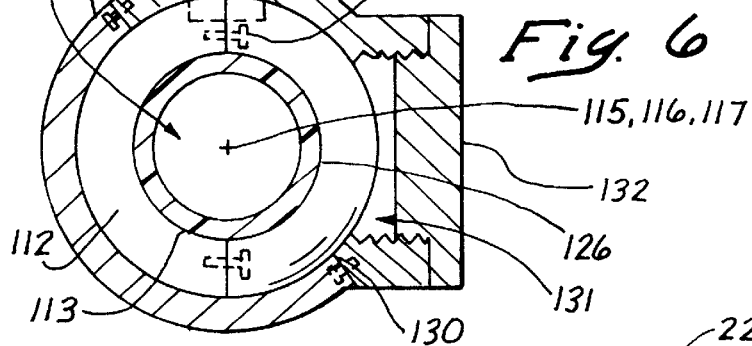
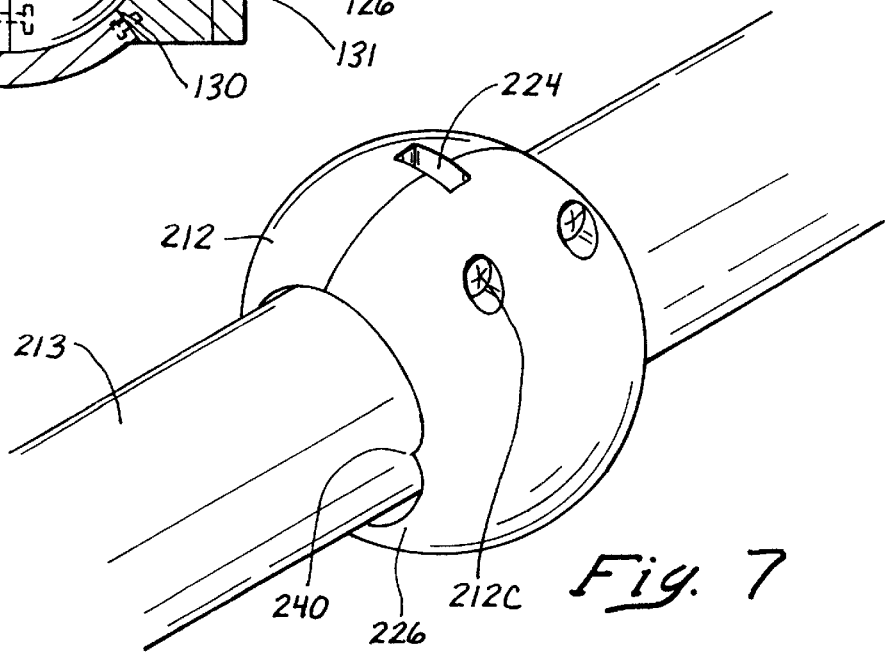

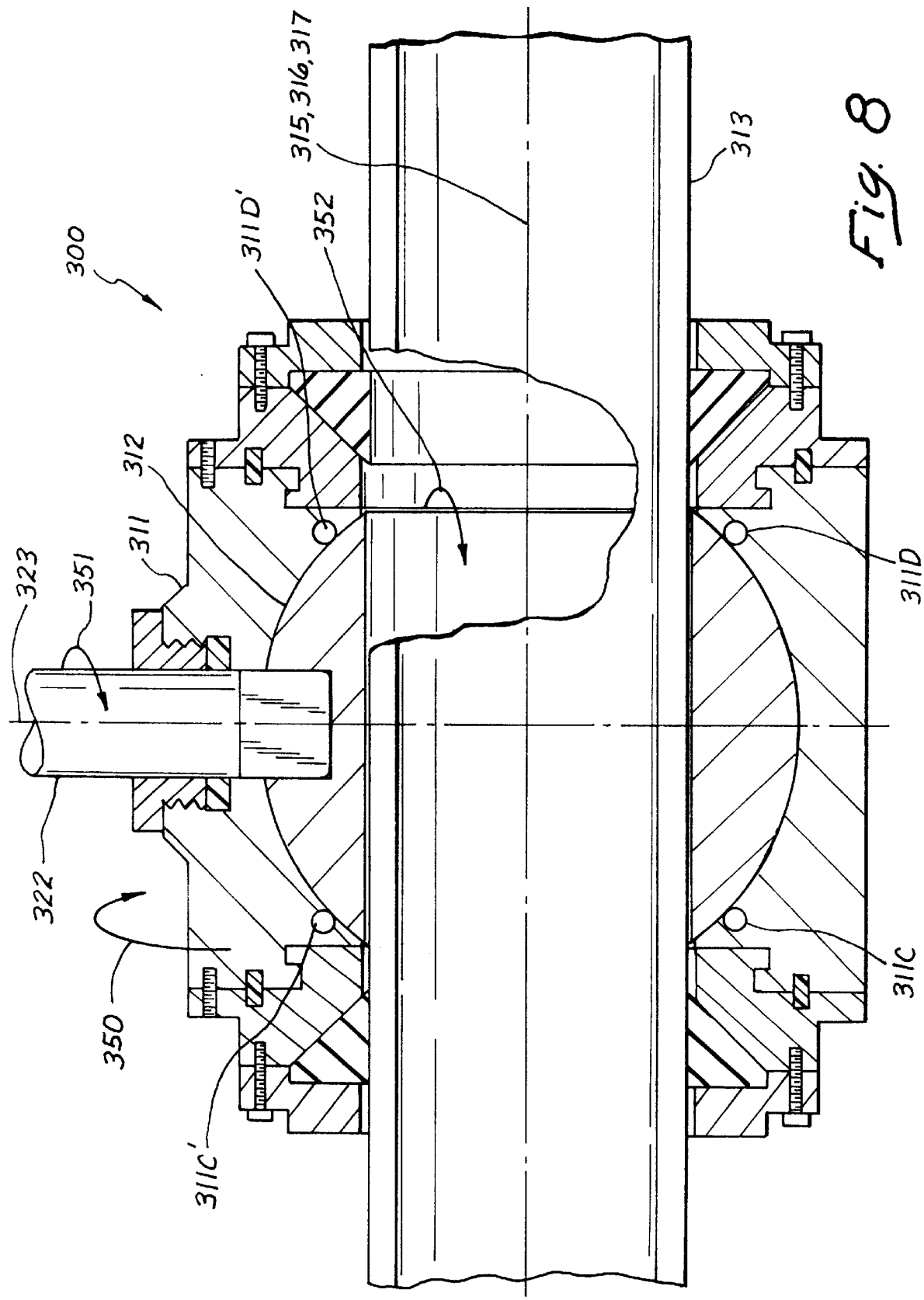

METHOD AND BALL VALVE ASSEMBLY FOR INSERTING A VALVE IN A LINE

BACKGROUND OF THE INVENTION

1. Technical Field

This invention relates generally to procedures and equipment for stopping an existing line containing fluid under pressure, and more particularly to a valve insertion method and associated ball valve assembly for inserting a valve in a line without having to shut down the line during the insertion.

2. Description of Related Art

An existing ball valve includes a spherically shaped valve element or ball within a valve housing that has a first or input port facing in a first direction and a second or output port facing in an opposite second direction. The housing defines a passageway for fluid flow. The passageway extends between the first and second ports along a central axis of the passageway. The ball occupies a position in the passageway that is intermediate the two ports so that the central axis of the passageway passes through the ball.

The ball is mounted within the housing movably so that an operator can twist a valve handle and thereby rotate the ball about an axis of ball rotation that is perpendicular to the central axis of the passageway. The operator can rotate the ball ninety degrees between a first (or open) position of the ball and a second (or closed) position of the ball. In the open position, a bore extending through the ball aligns with the central axis of the passageway so that fluid can flow through the bore. In the closed position, the bore is disposed transversely to the central axis of the passageway so that the ball blocks fluid flow.

The existing ball valve is installed in a line by coupling an input leg of the line to the input port and an output leg of the line to the output port. To insert the ball valve in an existing line containing fluid under pressure, the installer must first shut down the existing line so that it is no longer pressurized. Next, he cuts the line and then he installs the ball valve. Doing so disrupts service, and it can be quite time consuming and expensive. Thus, installers need a better way to insert a ball valve in an existing line containing fluid under pressure without having to shut down the line.

SUMMARY OF THE INVENTION

This invention alleviates the concerns outlined above by providing a ball valve assembly that is adapted to be assembled over an existing line, including a line containing fluid under pressure while the line remains intact and pressurized. Once assembled, a ball component within a housing component defines a bore through which the line extends. The ball component includes cutting edges such that when the installer rotates the ball component relative to the line, the cutting edges cut out a section of line.

In one embodiment, the cutting edges slice out a section of the line as the installer rotates the ball ninety degrees about an axis of ball rotation perpendicular to the central axis of the bore. This embodiment works well with polyethylene, PVC, plastic, and copper tubing, as well as other more easily cuttable lines. In a second embodiment, the ball valve assembly is configured to enable the installer to rotate the entire assembly (i.e., the housing component together with the ball component within it) on the line about the central axis of the bore while rotating the ball ninety degrees about the axis of ball rotation to the closed position. This double rotational action facilitates cutting and works well on larger, less easily cuttable lines.

In either case, the method and valve assemblies of the invention enable insertion without shutting down the line. Service is not disrupted. Insertion is less time consuming and less expensive.

To paraphrase some of the more precise language appearing in the claims, a method for inserting a valve in a line (e.g., an existing line containing fluid under pressure) includes the step of providing first and second subassemblies that are adapted to be assembled over the line to form a ball valve assembly having a ball component within a housing component. The ball component defines a bore extending through the ball component along a central axis of the bore. The ball component is adapted to be rotated ninety degrees within the housing component about an axis of ball rotation that is perpendicular to the central axis of the bore, and the ball component includes at least two cutting edges.

The method proceeds by assembling the first and second subassemblies over the line to form the ball valve assembly. Then, the user rotates the ball component relative to the line so that the cutting edges on the ball component cut out a section of the line. In one embodiment, the ball is rotated ninety degrees within the housing about the axis of ball rotation so that the cutting edges slice through the line. In another embodiment, the second subassembly is rotated with the ball about the line while the ball is rotated ninety degrees to the closed position, to thereby facilitate cutting. The following illustrative drawings and detailed description make the foregoing and other objects, features, and advantages of the invention more apparent.

BRIEF DESCRIPTION OF THE DRAWINGS

FIG. 1 of the drawings is an isometric view of a ball valve assembly constructed according to the invention;

FIG. 6 is an end view of a second embodiment of the invention that includes a clean out port through which the cut section of line is removed from the valve housing while the ball is in the closed position;

FIG. 7 shows the cutting edge configuration of a third embodiment of the invention; and FIG. 8 is a side view of a fourth embodiment of the invention in which the entire valve assembly is adapted to be rotated on the line for cutting purposes.

DESCRIPTION OF THE PREFERRED EMBODIMENTS

FIGS. 1–5 of the drawings show various aspects of a ball valve assembly 10 constructed according to the invention. Generally, the ball valve assembly 10 includes a housing subassembly 11 (FIGS. 1–5) and a ball subassembly 12 (FIGS. 2–5). The two subassemblies 11 and 12 are composed of a suitably rigid material (e.g., brass or other metal alloy) and they are adapted to be assembled over a line 13 (FIGS. 2–5) to form the ball valve assembly 10. In other words, they are configured to enable an installer to assembly them over a line containing water, gas, or other fluid under pressure without having to first shut down and cut the line.

Based upon the foregoing and subsequent descriptions, one of ordinary skill in the art can readily design and construct different size ball valve assemblies without departing from the scope of the claims. The illustrated ball valve assembly 10, however, is designed for use with various large and small line sizes, such as 1.32-inch outside diameter, 1.0-inch inside diameter, polyethylene tubing. The ball subassembly 12 is sized accordingly (about 1.5 inches in diameter with the housing subassembly 11 measuring about 3.0 inches to 3.5 inches in length. Many details of construction may be similar to the ball valve assemblies available from any of various commercial sources, including Hammond Valve Corporation, and B&K Industries, Inc., and many others.

Figure 2:
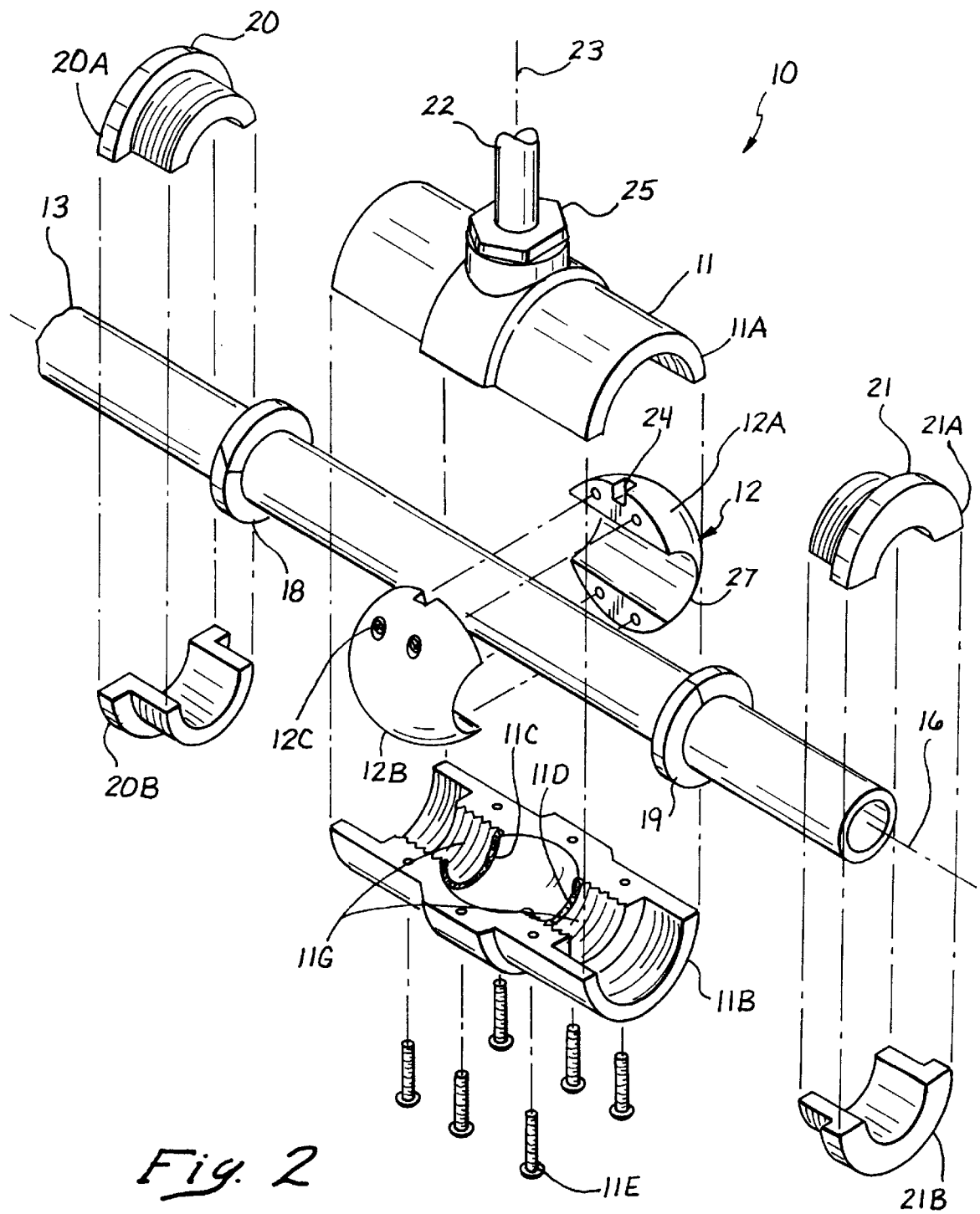
FIG. 2 is a disassembled view of the ball valve assembly, showing how the various components assemble over an existing line.

Refer to FIG. 2 for assembly details. Some of the claims refer to a first subassembly that is adapted to enable a user to assemble the first subassembly over the line as a ball component of the ball valve assembly such that the ball component defines a bore extending through the ball component along a central axis of the bore and the line extends through the bore. This is implemented with the ball assembly 12. The installer assembles the ball subassembly 12 over the line 13 by assembling first and second ball section 12A and 12B. Four or more screws hold the first and second ball sections 12A and 12B together. Only one screw 12C is designated in FIG. 2 for illustrative convenience in order to keep that figure less cluttered. Any of various other suitable means may be employed instead to hold the two ball sections 12A and 12B together, including a technique described later on with reference to FIG. 8 of using the housing subassembly 11 to hold the first and second ball sections 12A and 12B together.

Figure 4:
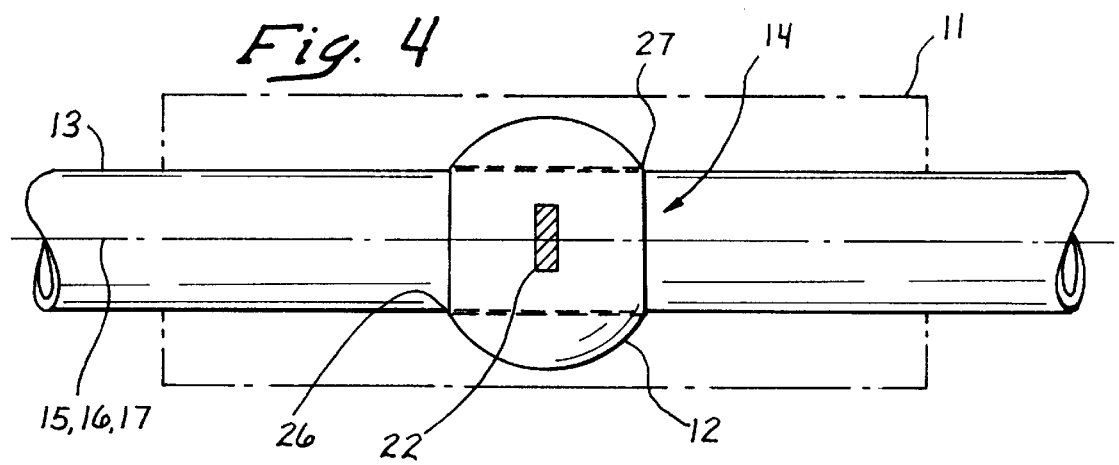
FIG. 4 is a top view after assembly but prior to rotating the ball about the axis of ball rotation.
Figure 5:
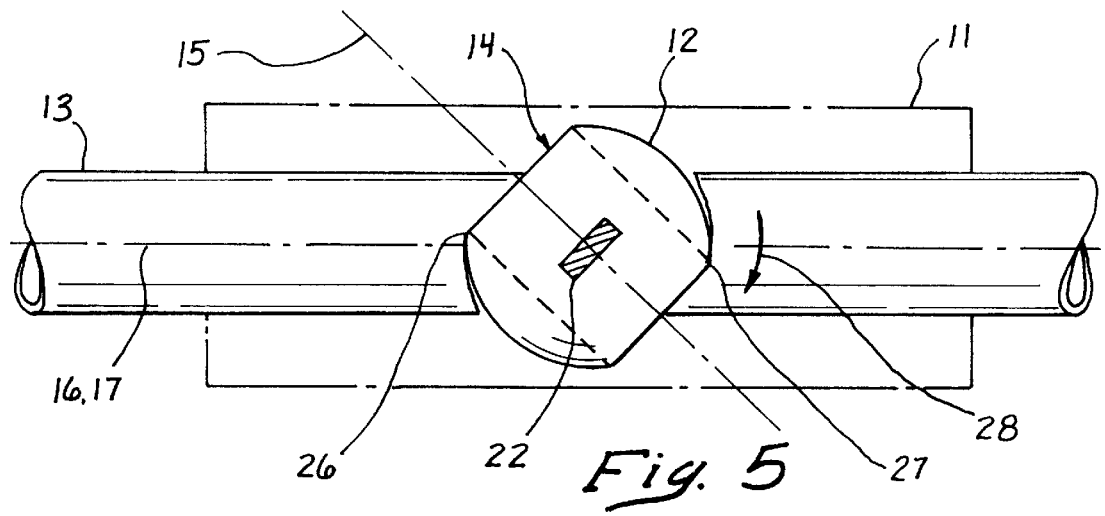
FIG. 5 is a top view similar to FIG. 4 showing how a section of the line is cut during rotation of the ball.

With the first and second ball sections 12A and 12B assembled together over the line 13, the ball subassembly 12 forms a ball component of the ball valve assembly 10. It is adapted to function as a ball component of a ball valve, and it has a bore 14 (FIGS. 4 and 5) through which the line 13 extends. The bore 14 extends along a central axis 15 of the bore 14 (FIGS. 4 and 5) and the line 13 extends along a central axis 16 of the line 13 (FIGS. 2, 4, and 5). The axes 15 and 16 are aligned in an open position of the ball subassembly 12 illustrated in FIG. 4.

Some of the claims refer to a second subassembly that is adapted to enable the user to assemble the second subassembly over the first subassembly and the line as a housing component of the ball valve assembly such that the housing component defines a passageway through which the line extends and in which the ball component is disposed. The second subassembly is adapted to enable the user to selectively rotate the ball component ninety degrees about an axis of ball rotation that is perpendicular to the central axis of the bore. This is implemented by the housing subassembly 11.

The housing subassembly 11 includes first and second housing sections 11A and 11B that assembly together to form the housing subassembly 11. The housing section 11B holds seal sections 11C and 11D (FIG. 2) between the housing section 11B and the ball subassembly 12. The seal sections 11C and 11D combine with similar sections on the housing section 11A (not visible in FIG. 2, but designated 11C' and 11D' in FIG. 3) to form seals between the housing subassembly 11 and the ball subassembly 12 similar to seals in existing ball valves. They prevent leaking when the ball subassembly 12 is in the closed position.

The installer assembles the housing subassembly 11 over the ball subassembly 12 and the line 13 by assembling the first and second housing sections 11A and 11B. Six or more screws hold the first and second housing sections 11A and 11B together. Only one screw 11E is designated in FIG. 2 for illustrative convenience. Any of various other suitable means for holding the first and housing sections 11A and 11B together (e.g., fusing) may be employed instead within the scope of the claims.

With the first and second housing sections 11A and 11B assembled, they form a housing component (or valve body component) of the ball valve assembly 10. It is adapted to function as a housing component of a ball valve, and it has a passageway 11F (FIG. 1) extending along a housing axis 17 (FIGS. 1, 4, and 5) that is aligned with the central axis 16 of the line 13 as depicted in FIG. 4. The line 13 extends through the passageway 11F of the housing subassembly 11 and through the bore 14 of the ball subassembly 12, with the ball subassembly 12 disposed within the passageway 11F, in a manner similar in some respects to a conventional ball valve arrangement.

Figure 3:
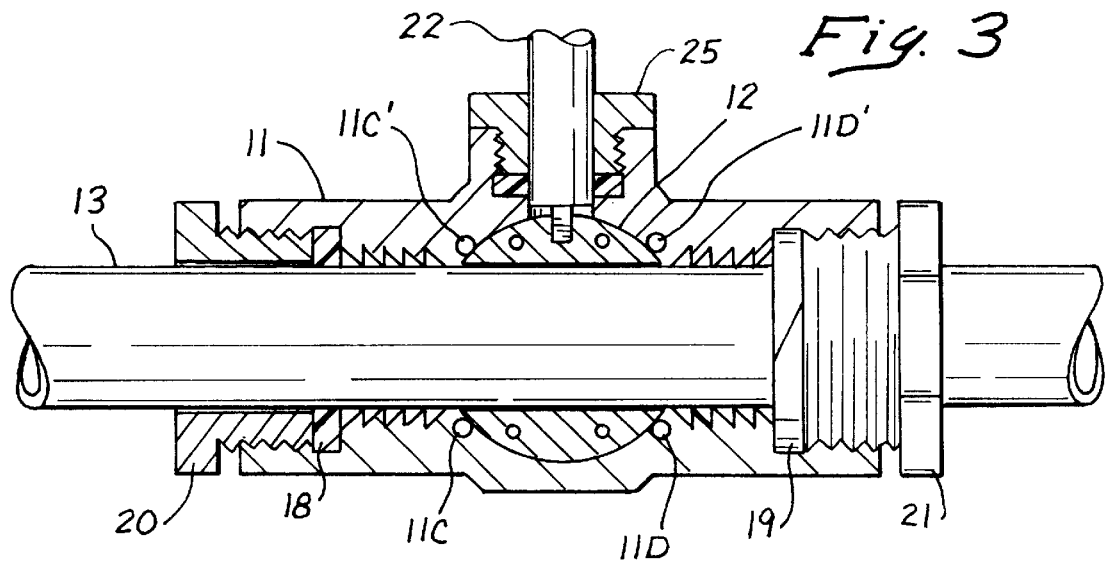
FIG. 3 is a side view with portions in cross sectional that shows the ball valve assembly after it has been assembled over the existing line.

The housing subassembly 11 includes first and second split rings 18 and 19 visible in FIGS. 2 and 3 (e.g., elastomeric sealing members) that the installer installs over the line 13 at opposite ends of the passageway 11F. Each is an annular ring with a cut in it that enables the installer to resiliently deform it and place it over the line 13 where it recovers its annular shape. The split rings 18 and 19 form a seal between the housing subassembly 11 and the line 13, and they help restrain the line 13 from pulling out of the ball valve assembly 10 after the line 13 has been cut.

Additional restraint is provided by gripping grooves 11G (FIG. 2). They are similar to gripping grooves in some existing valves and serve to grip onto the line 13 when the housing sections 11A and 11B are assembled. Another restraining method used for polyethylene includes existing fusing technology to fuse the split rings 18 and 19 permanently to the line 13 after the split rings 18 and 19 have been packed into the housing subassembly 11. Based upon the foregoing description, one of ordinary skill in the art can readily employ any of various means of assembling and sealing the housing subassembly 11 over the line 13, including fusing the subassembly 11 together and to the line 13 without sealing rings, using known electrical fusing techniques.

The housing subassembly 11 also includes first and second retainers 20 and 21 that screw or bolt into opposite ends of the housing component formed by the housing sections 11A and 11B. They serve to retain the first and second split rings 18 and 19 firmly in place in order to help form a tight seal between the line 13 and the first and second housing sections 11A and 11B. They pack the split rings 18 and 19 into the housing subassembly 11. The installer assembles first and second retainer sections 20A and 20B together over the line 13 to form the first retainer 20. He assembles third and fourth retainer sections 21A and 21B together over the line 13 to form the second retainer 21. Screwing the retainers 20 and 21 into the housing component (or advancing flanged or bolted retainers for large lines) holds the two sections of each together, although other means may be employed, including screwing, bonding, or pinning the two sections together.

In addition to the above, the housing subassembly 11 includes a shaft 22 that extends through the first housing section 11A to the ball assembly 12 (FIGS. 1–5). The shaft 22 serves as means for enabling the installer to selectively pivot or rotate the ball subassembly 12 ninety degrees about an axis of ball rotation 23 (FIGS. 1 and 2) that is perpendicular to the central axis 15 of the bore 14 of the ball subassembly 12. The shaft 22 extends into a slot 24 (FIG. 2) in the ball component formed by the first and second ball sections 12A and 12B so that by manually rotating the shaft ninety degrees, the installer can rotate the ball assembly 12 ninety degrees. A handle or gear reduction mechanism (not shown) may be provided on the shaft for the installer to use. A seal and retainer combination 25 (FIGS. 1–3) screws into the first housing section 11A to secure the shaft 22 and provide a seal.

With the valve assembly 10 assembled over the line 13 as described, the ball assembly 12 is initially in an open position as illustrated in FIG. 4. In the open position, the central axis of the ball assembly 12 is aligned with the central axis of the line 13 so that fluid flowing through the line flows through the bore 14. By rotating the ball ninety degrees about the axis of ball rotation 23, the installer moves the ball assembly 12 to a closed position in which the central axis 15 of the bore 14 is perpendicular to the central axis of the line 13. In the closed position, the ball assembly 12 blocks the flow of fluid through the line 13.

According to another aspect of the invention, the ball valve assembly 10 includes first and second cutting edge portions 26 and 27 of the ball assembly 12 (i.e., the ball component formed by the first and second ball sections 12A and 12B). They are adapted to slice through the line 13 as the user rotates the ball component ninety degrees about the axis of ball rotation 22 as depicted by an arrow 28 in FIG. 5. For that purpose, each of the cutting edge portions 26 and 27 forms a sharp semicircular cutting edge along the entrance to the bore 114.

Rotating the ball component results in a shearing action depicted in FIG. 5. That action cuts out a section of the line 13 as the ball component is rotated a full ninety degrees to a closed position of the ball component. The cut-out section of the line 13 remains in the bore 14 as the cut is completed, and the ball component blocks the flow of fluid through the line 13 when the ball component is in the closed position. Rotating the ball component back ninety degrees to the open position aligns the bore 14 with the line 13 to thereby enable fluid to again flow through the line 13.

FIG. 6 is a cross sectional view of a second embodiment of the invention, designated as ball valve assembly 100, that is taken in a plane perpendicular to the central axis 116 of the line 113 (which appears along with central axis 115 and housing axis 117 as just a dot in FIG. 6). The ball valve assembly 100 is similar in many respects to the ball valve assembly 10 and so only differences are described in further detail. For convenience, reference numerals designating parts of the ball valve assembly 100 are increased by one hundred over the reference numerals designating related parts of the ball valve assembly 10.

The major difference is that the housing subassembly 111 includes a clean-out port portion 130 of the housing subassembly structure that defines a clean-out port 131. The clean-out port 131 faces away from the line 113 and it is so disposed that the bore 114 aligns with it when the ball subassembly 112 is in the closed position. That way, the installer can remove the cut out section of the line 113 from the bore 114 through the port 131. A removable cap or flange 132 seals the clean-out port 131 when it is not in use. Stated another way, the housing subassembly 111 includes means (i.e., clean-out port portion 130) defining a port 131 covered with removable cap 132 for enabling the installer to remove a section of line from within the bore 114 of the ball component (i.e., the ball subassembly 112) after the ball component has been rotated ninety degrees to the closed position to slice through the line 113.

FIG. 7 is an enlarged view of another ball subassembly 212 use in a third embodiment of the invention, after the ball subassembly 212 has been assembled over a line 213. The ball assembly 212 is similar in many respects to the ball subassembly 12 and so only differences are described in further detail. For convenience, reference numerals designating parts of the ball assembly 212 are increase by two hundred over those designating related parts of the ball subassembly 12.

The major difference in the ball subassembly 212 is that the cutting edge portion 226 of the ball subassembly 212 includes a pointed protuberance 240. The protuberance 240 punctures the line 213 during the initial rotation of the ball subassembly 212 from the open position to the closed position in order to facilitate cutting of the line 113. The protuberance 240 is analogous in some respects to the pointed protruberance on some can openers that are use to produce a triangularly shaped opening in the top of a metal can.

FIG. 8 is an enlarged side view of a fourth embodiment of the invention. It is designated generally as a ball valve assembly 300. For convenience reference numerals designating parts of the ball valve assembly 300 are increase by three hundred over those designating related parts of the ball valve assembly 10.

The ball valve assembly 300 implements two major differences. First, the housing subassembly 311 is adapted to be rotated on the line 313 about the central axis of the line 313 (as depicted by an arrow 350 in FIG. 8) while the ball assembly 12 is rotated toward the closed position. The second main difference is in the cutting action resulting from the double rotational action. Rotating the subassembly 311 and the ball subassembly 312 about the line 313 causes cutting edges or teeth (counterparts of the sharp protuberance 240 for the ball subassembly 212 in FIG. 7) to mill through the line 313 something like cutting with a lathe, instead of slicing through the line. After the line 313 is cut, the installer rotates the shaft 322 as depicted by an arrow 351 in FIG. 8 to thereby rotate the ball subassembly 312 from an open position to a closed position as depicted by an arrow 352.

Based upon the foregoing and subsequent descriptions, one of ordinary skill in the art can readily practice the invention. Details of construction of the housing subassembly 311 are similar in many respects to the rotatable valve bodies described in U.S. Pat. No. 5,732,728 issued Mar. 31, 1998 to Maichel, and that patent is hereby incorporated herein by reference for the details of construction it provides.

The various ball valve assemblies described all implement the method of the invention in one form or another. Restating the method, it includes the step of providing first and second subassemblies that are adapted to be assembled over the line to form a ball valve assembly having a ball component within a housing component such that the ball component defines a bore extending through the ball component along a central axis of the bore, the ball component is adapted to be rotated ninety degrees within the housing component about an axis of ball rotation that is perpendicular to the central axis of the bore, the line extends through the bore, and the ball component includes at least two cutting edges. The method proceeds by assembling the first and second subassemblies over the line to form the ball valve assembly, and rotating the ball component relative to the line so that the cutting edges on the ball component cut out a section of the line. Each of ball subassemblies 12, 112, and 212 cut as they rotate about an axis of ball rotation that is perpendicular to the central axis of the line being cut, whereas the ball subassembly 312 cuts as it is rotated about the central axis of the line.

Thus, the invention provides a ball valve assembly that is adapted to be assembled over an existing line, including a line containing fluid under pressure while the line remains intact and pressurized. The invention enables valve insertion without having to first shut down the line. Service is not disrupted. Insertion is less time consuming and less expensive. Although exemplary embodiments have been shown and described, one of ordinary skill in the art may make many changes, modifications, and substitutions without necessarily departing from the spirit and scope of the invention.

What is claimed is:

1. A method for inserting a valve in a line, comprising:

providing first and second subassemblies that are adapted to be assembled over the line to form a ball valve assembly having a ball component within a housing component such that the ball component defines a bore extending through the ball component along a central axis of the bore, the ball component is adapted to be rotated ninety degrees within the housing component about an axis of ball rotation that is perpendicular to the central axis of the bore, the line extends through the bore, and the ball component includes at least two cutting edges;

assembling the first and second subassemblies over the line to form the ball valve assembly; and rotating the ball component relative to the line so that the cutting edges on the ball component cut out a section of the line.

2. A method as recited in claim 1, wherein the step of rotating the ball component includes rotating the ball component ninety degrees about the axis of ball rotation so that the cutting edges slice through the line.

3. A method as recited in claim 1, wherein the step of rotating the ball component includes rotating the ball component about the central axis of the bore to thereby facilitate cutting of the line.

4. A ball valve assembly for insertion in a line, comprising:

a first subassembly that is adapted to enable a user to assemble the first subassembly over the line as a ball component of the ball valve assembly such that the ball component defines a bore extending through the ball component along a central axis of the bore and the line extends through the bore;

a second subassembly that is adapted to enable the user to assemble the second subassembly over the first subassembly and the line as a housing component of the ball valve assembly such that the housing component defines a passageway through which the line extends and in which the ball component is disposed, which second subassembly is adapted to enable the user to selectively rotate the ball component ninety degrees about an axis of ball rotation that is perpendicular to the central axis of the bore; and first and second cutting edge portions of the ball component that are adapted to slice through the line as the user rotates the ball component ninety degrees about the axis of ball rotation.

5. A ball valve assembly as recited in claim 4, wherein the housing subassembly includes means defining a port with a removable cap for enabling the user to remove a section of line from within the bore of the ball component after the ball component has been rotated to slice through the line.

6. A ball valve assembly as recited in claim 4, wherein the cutting edges include at least one pointed protuberance for puncturing the line.

7. A ball valve assembly for insertion in a line, comprising:

a first subassembly that is adapted to enable a user to assemble the first subassembly over the line as a ball component of the ball valve assembly such that the ball component defines a bore extending through the ball component along a central axis of the bore and the line extends through the bore;

a second subassembly that is adapted to enable the user to assemble the second subassembly over the first subassembly and the line as a housing component of the ball valve assembly such that the housing component defines a passageway through which the line extends and in which the ball component is disposed, which second subassembly is (i) adapted to enable the user to selectively rotate the ball component ninety degrees about an axis of ball rotation that is perpendicular to the central axis of the bore, and (ii) adapted to enable the user to rotate the housing component on the line as the ball component is rotated ninety degrees to a closed position of the ball component; and first and second cutting edge portions of the ball component that are adapted to cut through the line as the user rotates the housing component and ball component about the line while rotating the ball component ninety degrees to the closed position.

* * * * *